United States Patent [19]

Newman

[11] Patent Number: 5,586,384
[45] Date of Patent: Dec. 24, 1996

[54] STATOR MANUFACTURING METHOD AND APPARATUS

[75] Inventor: Lawrence E. Newman, Tipp City, Ohio

[73] Assignee: Globe Products Inc., Huber Heights, Ohio

[21] Appl. No.: 430,738

[22] Filed: Apr. 28, 1995

[51] Int. Cl.$^6$ ............................................... H02K 15/085
[52] U.S. Cl. ........................... 29/596; 29/564.6; 29/732; 29/736; 29/759; 29/760
[58] Field of Search ............................ 29/596, 598, 732, 29/736, 759, 760, 564.1, 564.6

[56] References Cited

U.S. PATENT DOCUMENTS

| | | | |
|---|---|---|---|
| 5,090,108 | 2/1992 | Banner et al. | 29/596 |
| 5,495,659 | 3/1996 | Beakes et al. | 29/596 X |

Primary Examiner—Carl E. Hall
Attorney, Agent, or Firm—Roger S. Dybvig

[57] ABSTRACT

To reduce manufacturing cycle times, after a stator core is transferred by a transfer carriage along a track from a winding station to a coil lead terminating station at which lead wires extending from the coils to temporary wire clamps on the transfer carriage are connected by an industrial robot to terminal members on the stator core, the stator core is clamped to the track and the transfer carriage returned to the winding station immediately after the last lead wire to be removed from a temporary wire clamp is removed so that the transfer carriage returns to the winding station while the last lead wire is being connected to terminal member on the stator core.

8 Claims, 3 Drawing Sheets

6,586,384

STATOR MANUFACTURING METHOD AND APPARATUS

FIELD OF THE INVENTION

This invention relates to a stator manufacturing method and apparatus and, although not necessarily so limited, to a stator manufacturing method and apparatus especially adapted for the manufacture of 2-pole stators for electric motors or other electrical devices.

INCORPORATION BY REFERENCE

The disclosure of Alvin C. Banner et al. U.S. Pat. No. 5,090,108, granted Feb. 28, 1992, is hereby incorporated by reference herein.

BACKGROUND OF THE INVENTION

Modern stator manufacturing production lines include several different stations at which different manufacturing operations are performed. One such operation that is frequently accomplished at an early stage in the process of manufacturing a 2-pole stator is to assemble terminal members, either stator coil terminals or supports for stator coil terminals, on an unwound stator core. After the terminal members are assembled onto the stator core, a pair of stator coils are wound on the stator core pole pieces at a stator winding station using magnet wire having an electrically insulating coating. A common practice is to temporarily clamp the stator coil lead wires to wire clamps during the winding process. At a later manufacturing stage, the lead wires are connected to the terminal members on the stator core at a coil lead terminating station.

One type of stator manufacturing apparatus, which is disclosed in the above-mentioned Banner et al. U.S. Pat. No. 5,090,108, includes a support track along which unwound stators having cores on which terminal members have previously been assembled are moved to a stator winding station at which the stator coils are wound. The freshly wound stators are then moved along the support track to a coil lead terminating station at which the stator coil lead wires are connected to the terminal members on the core. Lead pull assemblies at the winding station have wire grippers which are manipulated to place the stator coil lead wires into temporary wire clamps. While maintaining their grip on the lead wires, the temporary wire clamps are moved to the coil lead terminating station along with the wound stator. Mechanisms at the coil lead terminating station remove the stator coil lead wires from the temporary wire clamps and connect them to the terminal members on the stator core.

An industrial robot is now commonly used to effect the terminal connections at the coil lead terminating station. Robots used for making the terminal connections are highly reliable and fast acting, but connect the lead wires to the stator terminal members one at a time. Each terminal connection is made by using the end effector of the robot to grip one of the coil lead wires and retract it from its associated temporary wire clamp. The end effector is then manipulated as required to effect a connection to the terminal member on the stator core. Typically, it may take four seconds or so for the end effector to complete the connection of a single lead wire to the terminal member.

There are cases in which the winding procedures that take place at the winding station will be done faster than all of the lead wires can be connected to the terminal members at the coil lead terminating station. In such cases, the winding operations must be interrupted after the winding of coils on a stator at the stator winding station and not resumed until after completion of the lead wire connections to all of the terminal members on the next previously wound stator at the coil lead terminating station and the subsequent transfer of the newly wound stator to the coil lead terminating station. Thus, the cycle time during which a stator is wound at the winding station and the coil lead wires are terminated at the coil lead terminating station includes an interval of time during which both the coil winding mechanisms and the coil lead connect mechanisms are idle while the transfer assembly is operated to disengage the stator at the coil lead terminating station, return to coil winding station, engage the stator at the winding station and, with assistance of a lead pull assembly at the winding station, temporarily grip the lead wires extending from the freshly wound stator. This interval of time is not particularly long, on the order of two to four seconds for each stator, but can be of substantial significance over an extended period during which stators are mass produced.

SUMMARY OF THE INVENTION

The primary object of this invention is to provide an improved method and apparatus for manufacturing stators for dynamoelectric devices. More particularly, an object of this invention is to reduce the cycle time required to wind coils of wire on a stator core and connect the coil lead wires to terminal members on the stator core. A more specific object of this invention is to reduce the delay in the winding and lead wire connecting operations caused by the need to disengage a stator and temporary clamp transfer assembly from a stator at the coil lead terminating station, move the transfer assembly to the winding station, engage the transfer assembly with the freshly wound stator at the winding station and, with the assistance of a lead pull assembly at the winding station, temporarily grip the lead wires extending from the freshly wound stator.

In accordance with this invention, a stator clamp assembly is provided at the lead wire terminating station that clamps a wound stator to the support track when the wound stator is located at the coil lead terminating station. Accordingly, the transfer assembly can be shuttled back to the winding station before all of the lead wires are terminated at the coil lead terminating station and, if the winding of the next stator at the winding station is already completed, the transfer assembly can be engaged with the freshly wound stator and, with the assistance of the lead pull assembly, the coil lead wires extending from the freshly wound coils connected to the temporary wire clamps at the same time as the last lead of the stator at the coil lead terminating station is being connected to a terminal.

In the method of this invention, the wound stator is clamped to the support track after it arrives at the lead wire terminating station and before the last of the lead wires to be removed from a temporary clamp is removed from that clamp. The transfer assembly is then shuttled back to the winding station as soon as the last of the lead wire is removed from its temporary wire clamp. In those cases in which the winding operations are completed before the lead wire terminating operations are completed, this method can reduce the processing times for winding and terminating the coil leads by several seconds. In one such method, the savings in cycle time is approximately three seconds for each stator.

Other objects and advantages will become apparent from the following description and the drawings.

BRIEF DESCRIPTION OF THE DRAWINGS

In FIG. 2, the stator coil leads are shown connected to terminal members on the stator core located at the coil lead terminating station and the stator clamp of this invention retracted to enable that stator core to be removed.

In FIG. 3, the stator coil leads are shown extended from the stator coils to temporary wire clamps that are part of the transfer assembly.

FIG. 5 illustrates the position of parts during the interval in which the last coil lead is being connected to a terminal member and indicates by solid and broken line arrows the movements of a transfer pin that forms part of the transfer carriage.

DETAILED DESCRIPTION

Figure 1:
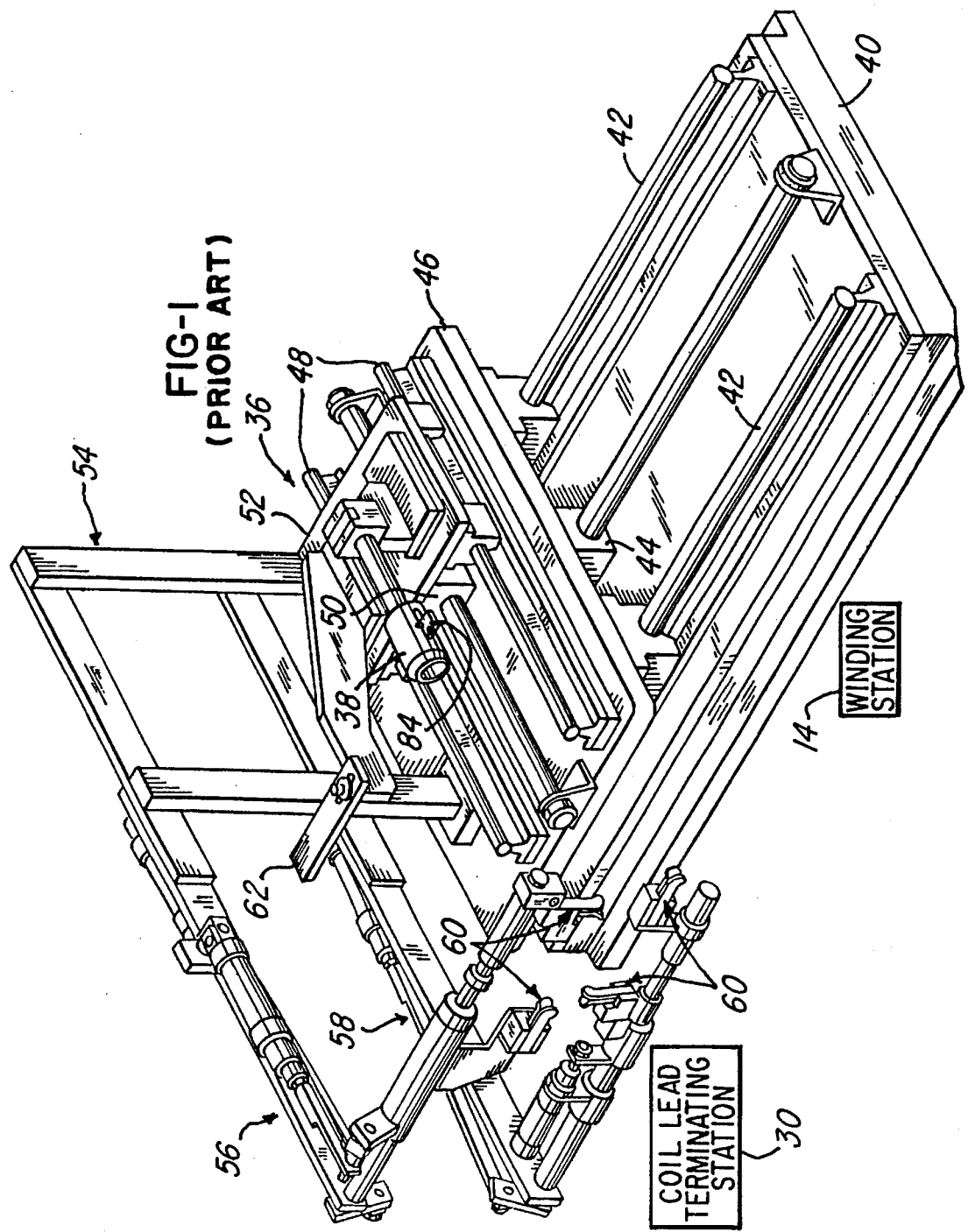
FIG. 1 is a perspective view of a wound stator transfer assembly for moving wound stator cores and stator coil lead wires extending from the coils wound thereon from the winding station, illustrated in block diagram form, to a coil lead terminating station, also illustrated in block diagram form. The stator transfer assembly represented in FIG. 1 is prior art and may be essentially the same as the corresponding structure illustrated in FIG. 4 of the above-mentioned Banner et al. U.S. Pat. No. 5,090,108.
Figure 2:
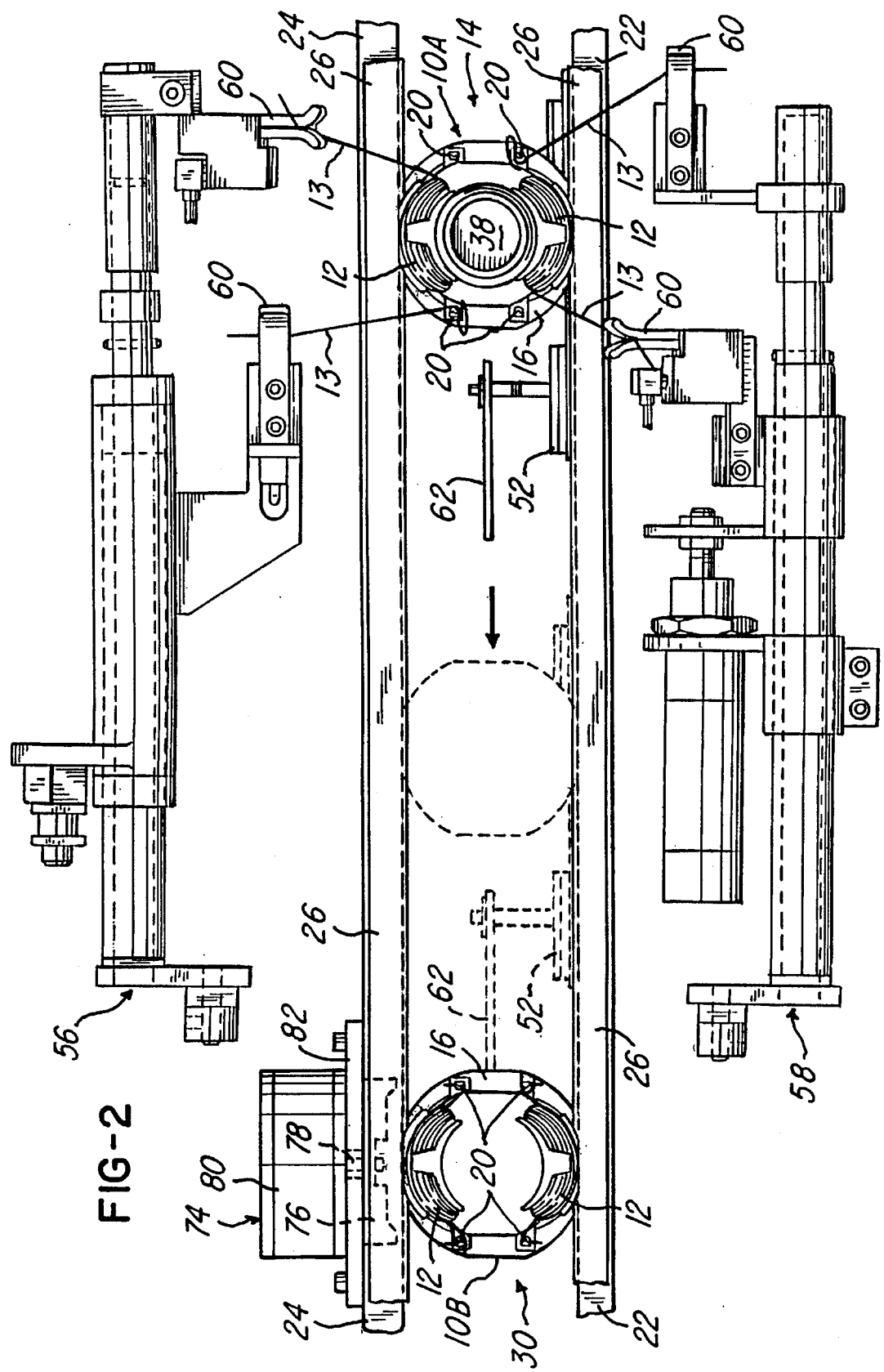
FIG. 2 is a simplified, fragmentary, elevational view of parts of a transfer carriage that forms part of the transfer assembly of FIG. 1, a trackway for supporting stator cores during processing, a wound stator core at the winding station, a wound stator at the coil lead terminating station, a wound stator illustrated by broken lines between the winding station and the coil lead terminating station, and a stator clamp assembly in accordance with this invention.

With reference to FIGS. 2 through 5, this invention is directed to the manufacture of a 2-pole stator 10 having a laminated stator core 11 on which coils 12 of wire having lead wires 13 extending therefrom are wound by a stator winding machine (not shown) at a stator winding station 14 (FIGS. 1 and 2). The stator 10 has front and rear plastic end plates 16 and 18, respectively, abutted against the end faces of the stator core 11. Front end plate 16 may also be termed a terminal mounting plate since it has terminal members 20 projecting outwardly therefrom. FIGS. 2 through 5 show the stator 10 supported and confined by a trackway that includes a lower, stator support track 22 and an upper, stator guide track 24. Both tracks 22 and 24 include guide plates 26 that are received within grooves 28 formed on the front of the stator 10 whereby the stators 10 being manufactured are confined for movement along the tracks 22 and 24. With reference to FIGS. 1 and 2, a stator 10 having coils wound at the winding station 14 is moved along the tracks 22 and 24 to a coil lead terminating station 30 by a transfer assembly, generally designated 36, which includes a transfer pin 38 adapted to fit within the bore of the stator 10. As will be further described below, the transfer pin 38 is repeatedly shuttled between the winding station 14 and the coil lead terminating station 30. Before it returns to the winding station 14, the transfer pin 38 is removed from the wound stator 10 at the coil lead terminating station 30 so that, upon return to the winding station 14, it can be inserted into the next stator 10 to be wound.

With reference to FIG. 1, the transfer assembly 36 comprises a fixed base 40 having gibs 42 and a rodless actuator 44 that guide and drive a main transfer carriage 46 in a direction parallel to the section of the tracks 22 and 24 along which the freshly wound stators 10 are moved to bring them to the lead terminating station 30. Main transfer carriage 46 has gibs 48 and a rodless actuator 50 that guide and drive a transfer pin carriage 52 in a direction perpendicular to the section of the tracks 22 and 24 along which a freshly wound stator 40 is moved to bring it to the lead terminating station 30. The transfer pin 38 is fixedly mounted on the transfer pin carriage 52. Accordingly, the transfer pin 38 may be shuttled between the coil lead terminating station 30 and the winding station 14 and also moved back and forth relative to the tracks 22 and 24, as suggested by the solid arrow in FIG. 5, so that it may move into and out of the bores of successively wound stators 10 to move them along the tracks 22 and 24 from the winding station 14 to the coil lead terminating station 30.

The main transfer carriage 46 also supports a framework 54 on which are mounted upper and lower wire clamp assemblies 56 and 58, respectively, that include temporary wire clamps 60. In operation, after a pair of coils 12 are wound on a stator core 11 at the winding station 14, the main transfer carriage 46 is moved toward the winding station 14 with the pin carriage 52 retracted away from the tracks 22 and 24. This brings the clamps 60 into the winding station 14 and, by operations not important to an understanding of the present invention, the stator coil lead wires 13 are gripped by the temporary wire clamps 60 as shown in association with the stator designated 10A at the winding station 14 in FIG. 2. The above-mentioned Banner et al. U.S. Pat. No. 5,090,108 contains a more detailed discussion of the manner in which temporary clamps, designated 68A, 68B, 68C and 68D therein, can grip the lead wires at a stator winding station. However, it should be recognized that the transfer assembly 36 shown in FIG. 1 hereof is prior art and that other transfer assemblies could be used in the practice of the present invention.

With continued reference to FIG. 1 and 2, after the lead wires 13 are gripped by the temporary clamps 60 and the transfer pin 38 inserted into the bore of the freshly wound stator 10A at the winding station 14, the main transfer carriage 46 is returned to the coil lead terminating station 30, as indicated by the arrow in FIG. 2. Along the way, the stator, designated 10B in FIG. 2 at the coil lead terminating station 30 is pushed further along the tracks 22 and 24 by a push plate 62 which is mounted on the main transfer carriage 46 in order to make room for the stator 10A being transferred to the coil lead terminating station 30.

Figure 3:
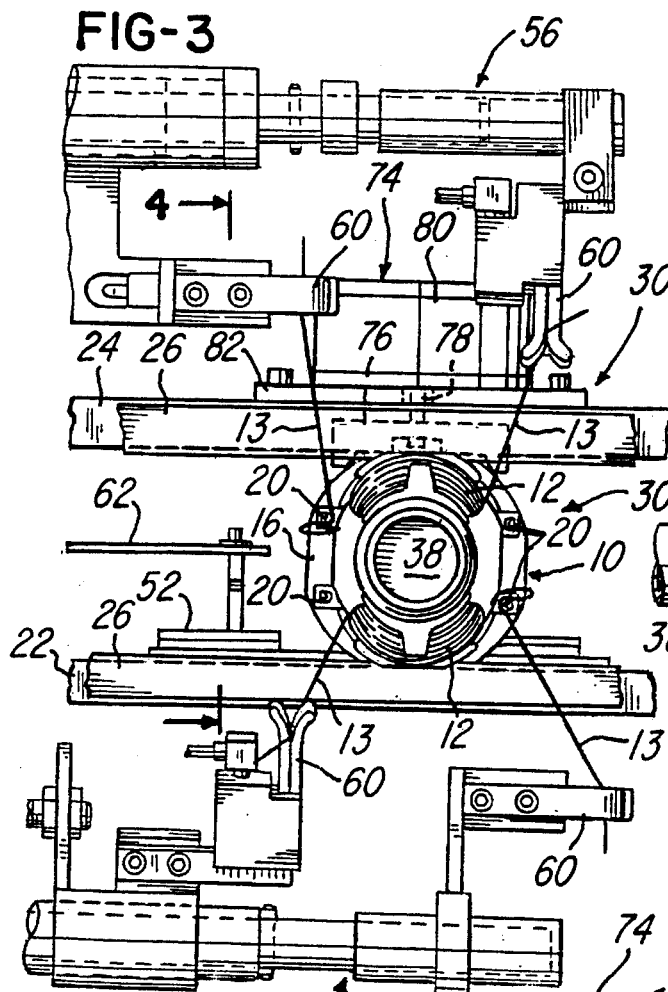
FIG. 3 is a fragmentary, elevational view of parts of the transfer assembly of FIG. 1, the trackway of FIG. 2, a wound stator core at the coil lead terminating station, and the stator clamp assembly in accordance with this invention.
Figure 4:
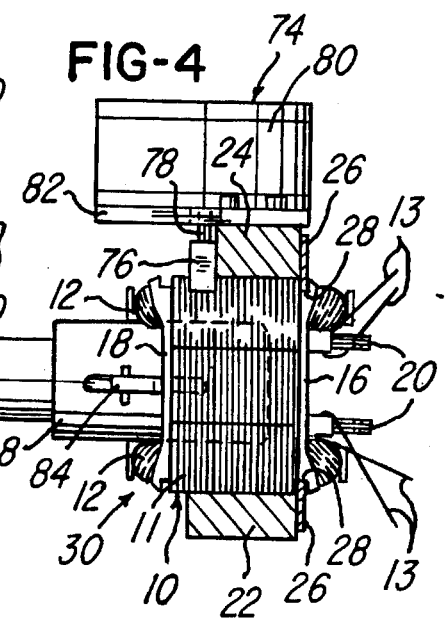
FIG. 4 is a fragmentary view, as viewed in the direction of arrows 4—4 of FIG. 3, of part of the transfer assembly, the trackway (shown in cross section), a wound stator core, and the stator clamp of this invention.

FIGS. 3 and 4 show the positions of parts just after a freshly-wound stator 10 has reached the coil lead terminating station 30. In FIG. 3, the transfer pin 38 is still located within the bore of the stator 10 and the stator coil lead wires 13 are still gripped by the temporary wire clamps 60. At this time, with reference to FIG. 5, a tooling assembly 70 and a robot, represented in FIG. 5 by its end effector 72, undergo a series of motions by which the stator coil lead wires 13 are removed one at a time from their respective temporary wire clamps 60 and connected to respective ones of the terminal members 20 projecting from the front of the stator 10. The above mentioned Banner et al. U.S. Pat. No. 5,090,108, contains a more detailed description of the manner in which the coil lead wires, designated 54 therein, can be connected to stator terminal members, designated 52 therein.

The method and apparatus as thus far described are not new and may differ from the specific embodiment disclosed herein. It will be noted that the main transfer carriage 46 must remain in the coil lead terminating station 30 until the robot end effector 72 has clamped the last of the lead wires 13 to be terminated at the coil lead terminating station 30 so that all of the lead wires 13 will be in position to be engaged by the robot end effector 72.

The practice in the past has been to retract the transfer pin 38 from the wound stator at the coil lead terminating station 30 only after all of the lead wires 13 have been connected to their respective terminal members 20. This provides the advantage that the transfer pin 38 helps to hold the stator 10 in a fixed position while the robot is functioning to complete the terminal connections. However, there may be an interval of several seconds between the time that the robot end effector 72 first grips the last of the stator coil lead wires 13 to be connected to a terminal member and the time at which such last lead wire 13 is connected to its respective terminal member 20. If during this interval the winding apparatus (not shown) at the winding station 14 has already completed the winding of coils on the stator core at the winding station, and is sitting idle, valuable cycle time will be lost.

Figure 5:
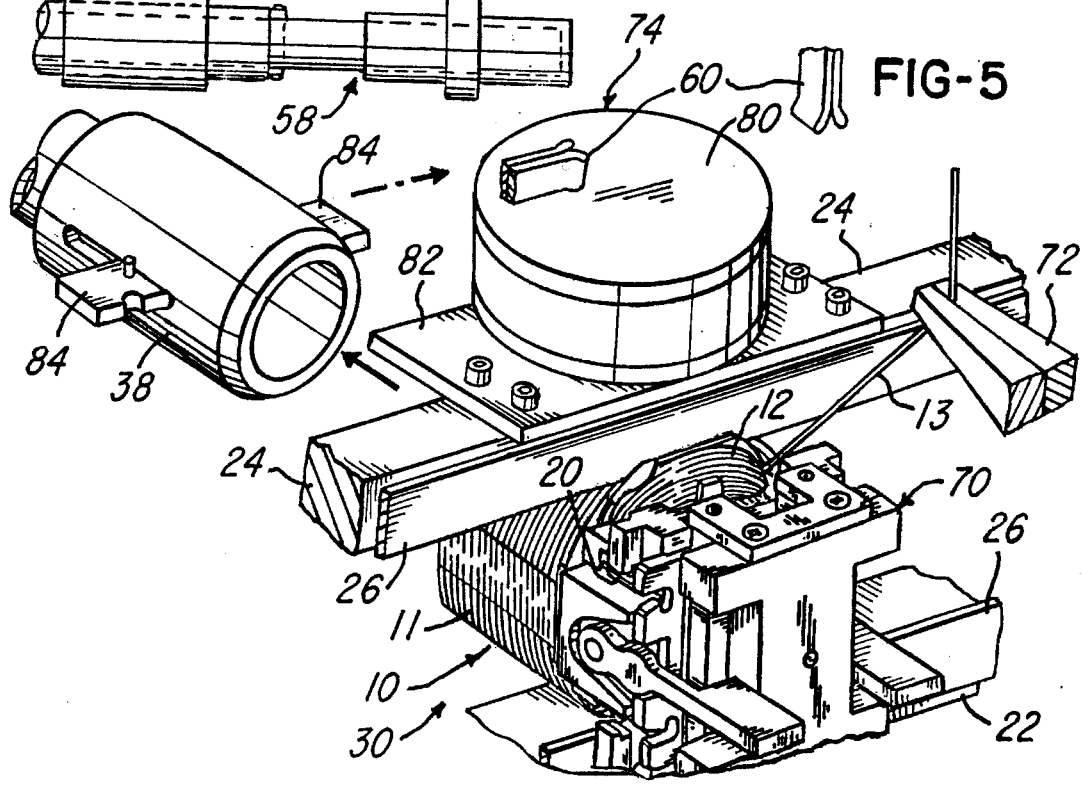
FIG. 5 is a fragmentary perspective view, with parts in cross section, of part of the transfer assembly, the trackway, a wound stator core, a robot and associated tooling used to connect the stator coil lead wires to terminal members on the stator core.

In accordance with this invention, the lost cycle time can be reduced by the simple expedient of returning the main transfer carriage 46 to the winding station 14 immediately after the robot end effector 72 has control of the last lead wire 13 to be connected to a terminal member 20. This is represented in FIG. 5, wherein all of the lead wires have been connected to a terminal member except for the lead wire 13, which has just been removed from its associated wire clamp 60 by the robot end effector 72, and the end effector 72 is beginning its motions to connect that last lead wire 13 to its associated terminal member 20. As soon as the last lead wire 13 is under the control of the robot end effector 72, the transfer pin 38 is retracted from the bore of the stator 10 by operation of the rodless actuator 50, as indicated by the solid arrow in FIG. 5, and returned, as indicated by the broken line arrow in FIG. 5, to the winding station 14 by movement of the main transfer carriage 46 by operation of the rodless actuator 44. By this expedient, while the robot end effector 72 is completing the task of connecting the last lead wire 13 to its associated terminal 20, the transfer assembly 36 and the parts carried thereby can be operated to insert the transfer pin 38 into the bore of the freshly-wound stator 10 at the stator winding station 14, and the machine operations carried out to cause the lead wires 13 extending from the coils of the freshly wound armature 10 at the winding station 14 to be gripped by the temporary wire clamps 60 in the manner described in the above-mentioned Banner et al. U.S. Pat. No. 5,090,108.

Further in accordance with this invention, and as shown in FIGS. 2, 3, 4 and 5, the stator 10 at the coil lead terminating station 30 is held in a stable position during the final lead terminating procedure by means of a stator clamp assembly, generally designated 74, which comprises a stator clamp plate 76 connected to the piston rod 78 of an air operated, clamping actuator 80 fixedly mounted by a mounting plate 82 on the top of the upper track 24 at the coil lead terminating station 30. As shown in FIG. 4, the stator clamp plate 76 abuts or nearly abuts the rear face of the upper track 24 so that it cannot rotate about the axis of the piston rod 78. Air actuator 80 preferably has a low profile in order not to interfere with the movements of parts of the transfer assembly. An air actuator suitable for this purpose is known commercially as Bimba Flat-1, which is available from Bimba Manufacturing Company, Monee, Ill. 60449-0688.

In operation, after a freshly-wound stator 10 is transferred to the coil lead terminating station 30, the robot end effector 72 and tooling assembly 70 is operated to commence connection of the coil lead wires 13 to the terminal members 20. At about the same time, or shortly thereafter, the stator clamp assembly 74 operates to bring the stator clamp plate 76 into clamping engagement with the stator core 11 as shown in FIGS. 3 and 4, whereupon the stator 10 is firmly gripped between the support track 22 and the stator clamp plate 76. At this time, the transfer pin 38 remains within the bore of the stator 10 but it could be retracted from the stator 10 at any time after the stator 10 is clampingly engaged by the stator clamp plate 76. It may be noted that the transfer pin 38 illustrated in the drawings has an associated spring biased plate 84 which bears against the confronting surface of the stator 10 to help prevent unwanted motions of the stator 10 while the lead connecting operations take place at the coil lead terminating station 30. However, such restraint, if desired, is unnecessary after the stator core is clamped between the stator clamp plate 76 and the support track 22.

As soon as the robot end effector 72 has control of the last of the lead wires 13 to be terminated, as indicated by the lead wire 13 in FIG. 5, the transfer pin 38 is retracted from the stator 10 (if it was not previously retracted) as indicated by the solid arrow in FIG. 5 and returned to the winding station as indicated by the broken line arrow in FIG. 5. The last lead wire 13 is then connected to its associated terminal member 20 whereupon the tooling assembly 70 and, if necessary, the robot end effector 72, is moved away from engagement with the stator 10. Clamp actuator 80 is then operated to raise the stator clamp plate 76 out of engagement with the stator 10 at the coil lead terminating station 30, as shown by phantom lines in FIG. 2 to permit that stator to be pushed out of the coil lead terminating station 30, as described above, when the next freshly-wound stator is transferred from the winding station 14 to the coil lead terminating station 30. As already described, the main transfer carriage 46 returns to the stator winding station 14 and engages the freshly-wound stator 10 therein so that it can transfer the freshly wound stator 10 to the coil lead terminating station 30 as quickly as possible after the last lead wire termination is made at the coil lead terminating station 30.

The foregoing operations can be repeatedly performed to mass produce wound stators with terminated lead wires. In one case, actual savings in cycle time of between 2.5 to 3.5 seconds per stator was obtained by the practice of this invention. Such a reduction in cycle time can be of considerable economic benefit over the course of a production run.

Although the presently preferred embodiment of this invention has been described, it will be understood that within the purview of the invention various changes may be made within the scope of the following claims.

I claim:

1. Stator manufacturing apparatus for winding stator coils on a stator core at a winding station, temporarily clamping the coil lead wires leading to and from the coils by temporary wire clamps, and for removing the stator coil lead wires from the temporary wire clamps at a coil lead terminating station, said apparatus comprising:

a stator support track that supports a stator being wound at the winding station, that extends from the winding station to the coil lead terminating station, and that supports a stator at the coil lead terminating station while lead wire terminations are being made;

a stator transfer assembly comprising a main carriage that shuttles between the stator winding station and the coil lead terminating station, a stator bore-engaging pin mounted on said carriage that moves a wound stator supported by said support track from said stator winding station and said coil lead terminating station, and temporary wire clamps mounted on said carriage; and a stator clamp assembly at said coil lead terminating station that clamps a wound stator against said support track when a wound stator is located at said coil lead terminating station, thereby permitting said transfer assembly to be shuttled back to the winding station before all of the lead wires are terminated at the coil lead terminating station.

2. The stator manufacturing apparatus of claim 1 wherein said stator clamp assembly comprises a vertically movable stator clamp plate at said coil lead terminating station, said clamp plate having a lower surface facing said support track which has a contour that complements the contour of the upper surface of a stator core to be clamped.

3. The stator manufacturing apparatus of claim 2 wherein said stator clamp assembly further comprises an air actuator having a vertically movable piston rod connected to said clamp plate.

4. The stator manufacturing apparatus of claim 1 further comprising an upper track above and parallel to said support track, the stators being manufactured being confined for sliding movement between said support track and said upper track.

5. The stator manufacturing apparatus of claim 4 wherein said stator clamp assembly comprises a vertically movable stator clamp plate at said coil lead terminating station, said clamp plate having a lower surface facing said support track which has a contour that complements the contour of the upper surface of a stator core to be clamped.

6. The stator manufacturing apparatus of claim 5 wherein said stator clamp assembly further comprises an air actuator mounted on said upper track having a vertically movable piston rod connected to said clamp plate.

7. A method of manufacturing stators using an industrial robot at a coil lead terminating station for connecting stator coil lead wires extending from coils wound on a stator core and utilizing a wound stator transfer assembly for transferring a wound stator from a stator coil winding station to the coil lead terminating station, the transfer assembly including a transfer carriage on which are mounted a transfer pin insertable into the bore of a stator core at the winding station and plural wire clamps for temporarily gripping stator coil lead wires in a fixed position relative to the stator core so that the lead wires may be engaged by an end effector of the industrial robot at the coil lead terminating station, said method comprising:

winding coils of wire on a stator core at the winding station;

while said stator is located at said winding station, gripping the lead wires leading from the wound coils by the wire clamps mounted on the stator transfer carriage;

transferring the wound stator core to a coil lead terminating station by inserting said transfer pin into the bore of the wound stator and then moving the stator transfer carriage from the winding station to the coil lead terminating station;

while the wound stator core is at the coil lead terminating station, manipulating the robot end effector to begin removing the lead wires from their respective temporary wire clamps and connect the lead wires to respective terminal members on the stator core in seriatim;

removing the transfer pin from the stator bore after the stator is located at the coil lead terminating station and before the last lead wire to be connected to a terminal member is connected to a terminal member;

after the last lead wire to be connected to a terminal member is removed from its associated wire clamp by manipulating the robot end effector but before completion of the connection of the last lead wire to its associated terminal member by manipulation of the robot end effector, returning the transfer carriage to the winding station; and completing the connection of the last lead wire to its associated terminal member by manipulation of the robot end effector.

8. The method of claim 7 wherein the stator is moved to the coil lead terminating station along a support track that extends from the winding station to the lead terminating station, and further comprises clamping the stator to the support track at the coil lead terminating station before the step of removing the transfer pin from the bore of the stator and maintaining the stator clamped to the support track while completing the connection of the last lead wire to its associated terminal member.

* * * * *